United States Patent Office 3,419,073
Patented Dec. 31, 1968

3,419,073
METHOD FOR CONSOLIDATING SUBTERRANEAN FORMATIONS
Fred A. Brooks, Jr., Houston, Tex., assignor to Esso Production Research Company, a corporation of Delaware
No Drawing. Filed Aug. 3, 1967, Ser. No. 658,034
11 Claims. (Cl. 166—33)

ABSTRACT OF THE DISCLOSURE

A method for consolidating an incompetent formation surrounding a borehole wherein an aliphatic alcohol containing from five to ten carbon atoms per molecule is injected into the formation and a resin is thereafter employed to bond the formations solids in place.

BACKGROUND OF THE INVENTION

Field of the invention.—This invention relates to the use of resins for the consolidating of incompetent formations surrounding oil wells, gas wells and similar boreholes.

Description of the prior art.—Phenol-formaldehydes, urea-formaldehydes, epoxies and similar resins have been widely used for the consolidation of incompetent formations surrounding oil wells, gas wells and similar boreholes. The methods generally employed are of two types, those in which a resin solution or a mixture of resin-forming materials containing a catalyst or hardening agent is injected into the formation to coat the formation solids and bond them in place and the in-situ methods wherein a solution containing one or more materials used in forming the resin is first injected to coat the solids and a solution containing a catalyst or other material necessary for completion of the reaction is subsequently injected to form the bond. Experience has shown that such methods are generally satisfactory but that difficulties due to high injection pressure requirements, poor bonding strength and severe permeability damage are often encountered, particularly in "dirty" sands. It has been suggested that the bonding difficulties can be alleviated by pretreating the formation with a surfactant solution or a low molecular weight alcohol, aldehyde, ketone, ether or amine which will remove connate water from the sand and render it preferentially wettable by the resin solution or solution of resin-forming materials. Although the use of such a surfactant solution or organic solvent improves the bonding strength, problems of the type described above are nevertheless frequently encountered.

SUMMARY OF THE INVENTION

In accordance with this invention, it has now been found that the difficulties outlined above can generally be alleviated by injecting normal hexanol or a similar aliphatic alcohol containing from five to ten carbon atoms per molecule into the unconsolidated formation, shutting in the well for a period of from about 30 minutes to about 120 hours, and thereafter injecting the resin solution or mixture of resinous materials to be used for consolidation purposes. Laboratory tests have shown that pretreatment of the formation in this manner facilitates the later injection of resinous materials, improves the strength obtained on setting of the resins, and reduces permeability losses due to consolidation. These benefits have been confirmed by successful field tests in formations where sand consolidations using conventional methods have generally been unsuccessful.

The mechanisms responsible for the improved results obtained in accordance with the invention are not fully understood. It is believed, however, that many of the difficulties encountered heretofore have been due to the presence of montmorillonite and mixed layer clays which swell and become dispersed in aqueous fluids native to the formation or introduced during drilling, completion or workover operations. The $C_5$ to $C_{10}$ alcohols, which are much less soluble in water and have considerably higher partition coefficients and interfacial tension values with respect to water than do the low molecular weight alcohols utilized heretofore, apparently extract interstitial water from the clay mineral lattices and, as they flow through the pore spaces, force the clays into ordered arrangements in response to interfacial forces. This facilitates the later injection of resinous materials, promotes better contact between the resin and sand grains, and results in a more permeable formation following sand consolidation. Although other phenomena may also be involved, the results obtained in formations containing kaolinite, illite, montmorillonite and other clays in high concentrations indicate that these mechanisms play an important role.

DESCRIPTION OF THE PREFERRED EMBODIMENTS

The alcohols useful for the purposes of the invention are saturated aliphatic alcohols containing from five to ten carbon atoms per molecule. Suitable compounds include 1-pentanol, 2-pentanol, 2-methyl-4-butanol, 1-hexanol, 2-hexanol, 3-hexanol, 4-methyl-1-pentanol, 2,2-dimethyl-4-butanol, 2-methyl-5-pentanol, 1-heptanol, 2-methyl-1-hexanol, 2,4-dimethyl-3-pentanol, 1-octanol, 2-ethyl-1-hexanol and mixtures and isomers of such alcohols. Normal hexanol has been found particularly effective for purposes of the invention and is therefore generally preferred over the other alcohols.

The alcohols set forth above may be employed in conjunction with a variety of different resinous materials. The phenol-formaldehyde type resins prepared by the reaction of formaldehyde, acetaldehyde, propionaldehyde or a mixture of water-soluble aldehydes with a low molecular weight hydroxy aryl compound such as phenol, cresol, β naphthol, resorcinol, xylenol, cresylic acid or a mixture of such compounds in a weight ratio between about 1:1 and about 9:1 are preferred. The reaction of these materials to form the resins can be catalyzed by the addition of from about 2 percent to about 10 percent by weight, based on the aldehyde-hydroxy aryl compound mixture, of an alkaline catalyst such as guanidine carbonate, aminoguanidine bicarbonate, sodium hydroxide, sodium carbonate, ethyl amine, triethyl amine, aniline, ethylene diamine or the like. From about 0.25 percent to about 10 percent by weight, based on the aldehyde-hydroxy aryl compound mixture, of an acid catalyst such as stannous chloride, magnesium chloride, hydrochloric acid, sulfuric acid, maleic anhydride, picric acid, benzene sulfonic acid, sulfanilic acid, alpha naphthylamine sulfonic acid, sodium-1 naphthylamine-3,6,8-trisulfonate or the like can also be used.

The water-soluble aldehyde, low molecular weight hydroxy aryl compound and catalyst employed for production of the phenol-formaldehyde type resins are preferably mixed before they are injected into the formation but may be utilized in a two-stage procedure if desired. The solution injected in the first stage of such a two-stage procedure will normally include all of the reactants except the low molecular weight hydroxy aryl compounds. The solution injected in the second stage will generally be an oil solution which contains the hydroxy aryl compound and is substantially immiscible with the first solution. The second solution displaces excess quantities of the first solution from the pore spaces in the formation and at the same time contributes sufficient low molecular weight hydroxy aryl compound to the remaining portion of the first solution to permit reaction of the materials and formation of the resin. The use of the phenol-formaldehyde resins and reactive mixtures which produce such resins has been described at length in the patent literature and will be familiar to those skilled in the art.

Various epoxy resins can be employed in lieu of the aldehyde type resins described in the preceding paragraph. The useful epoxies include the diglycidyl ethers of bisphenol A[bis (4-hydroxy phenol) dimethylmethane] obtained by the reaction between epichlorohydrin (1-chloro-2,3 epoxypropane) and bisphenol A in the presence of an alkali such as sodium hydroxide or potassium hydroxide. Similar resins can be prepared by reacting a mononuclear di- or trihydroxy phenol such as resorcinol, hydroquinone, pyrocatechol or phloroglucinol or a polynuclear polyhydroxy phenol such as 4,4'-dihydroxy biphenyl with a halohydrin such as 1,2-dichloro-3-hydroxypropane or dichlorohydrin. Still other satisfactory materials include the commercial epoxy resins prepared by the condensation of novolac resins with epichlorohydrin.

The epoxy resins are employed in conjunction with curing agents or catalysts such as diethylene triamine, ethylene diamine, triethylene tetramine, dimethylamino propylamine, diethylamino propylamine, piperidine, menthane diamine, triethylamine, benzyl diethylamine, diethylamino phenol, ditrmethylamnomethylphenol, α-methylbenzyl dimethylamine, meta-xylene diamine, 4,4'-methylene dianiline and mixtures of such amines. Acidic catalysts such as oxalic acid, phthalic acid, pyromellitic acid, pyromellitic dianhydride and dodecenyl succinic anhydride can also be employed.

The epoxy resins may be used in single stage operations wherein a mixture of the resin and an inert diluent is injected into the formation or in two-stage operations in which the resin is dissolved in a solvent such as a mixture of ethyl alcohol, acetone or methyl ethyl ketone with kerosene, diesel oil or white oil containing added aromatics and is injected into the formation and a kerosene or diesel oil that is substantially free of aromatics and contains the catalyst or curing agent is thereafter injected. The later injected solution displaces excess resin solution from the pore spaces. The catalyst or curing agent contained in the second solution is extracted by the resin solution that remains in contact with the sand grains. In the presence of extracted catalyst or curing agent the resin hardens and bonds the individual sand grains in place. The use of epoxy resins in both single stage and two stage sand consolidation processes has also been described at length in the prior art.

Still other resins which may be employed include the furfuryl alcohol resins and the urea formaldehyde resins. The furfuryl alcohol formulations are generally utilized by injecting furfuryl alcohol, furfuryl alcohol resin, or a mixture of the alcohol and resin into the formation and thereafter pumping in an oil overflush solution containing a low molecular weight organic acid such as trichloroacetic acid or a delayed acid producing chemical as a atalyst or curing agent. An oil preflush containing a surface active agent is generally used to remove water blocks and render the sand preferentially water wet. The resin solution usually contains a surfactant and a silane compound designed to improve bonding to the sand grains and a diesel oil "spacer" is normally injected between the resin solution and catalyst or curing agent solution. The urea-formaldehyde resins are employed by injecting an aqueous solution containing urea, formaldehyde, an accelerator such as ammonium sulfate or ammonium chloride, and a retarder such as ammonium hydroxide or hexamethylenetetramine into the formation and allowing the material to set. Magnesium chloride or a similar chloride salt can be added to facilitate polymerization in carbonate formations. The use of these furfuryl alcohol and urea-formaldehyde resins has also been described in detail in the literature and will be familiar to those skilled in the art.

In carrying out the process of the invention, the alcohol utilized as a preflush will generally be employed in quantities between about 10 and about 100 U.S. gallons per foot of formation thickness. The quantity required for optimum results will depend in part upon the permeability, porosity and clay content of the formation, upon the composition of the fluids present in the formation, upon the particular alcohol selected, and upon the particular resin or mixture of resin-forming constituents to be used. The use of from about 25 to about 50 gallons per foot of formation thickness has been found effective under most conditions and will normally be preferred.

Additives may be employed in the alcohols if desired. Silane compounds, particular amino-functional organo silanes, are particularly useful as coupling agents to further improve bonding of the resins to the sand grains, Typical silanes that may be employed for this purpose include 2-aminoethyl-aminopropyl-trimethoxy silane, 2-aminoethyl-aminopropyl-thiethylene oxide silane, 2-aminomethyl-aminopropyl-trimethoxy silane, 2-aminopropyl-aminopropyl-trimethoxy silane, 1-trimethoxy-2-aminoethyl-2-aminopropyl disilane, 1-triethyl oxide-2-aminoethyl - 2 - aminopropyl disilane, 1 - trimethoxy - 2-aminopropyl-2-aminopropyl disilane and 1-trimethoxy-2-aminoethyl-2-aminoethyl disilane. These compounds may be incsorporated in the alcohols in concentrations in the range between about 0.1 and about 10 percent by weight but will preferably be employed between about 1 percent and 5 percent by weight.

If the formation which is to be consolidated has produced significant quantities of sand, it will generally be advisable to inject sand or gravel through the perforations and thus fill any cavities that exist behind the casing before commencing the sand consolidation treatment. This can be done by suspending the sand or gravel in salt water, diesel oil or a similar fluid and then injecting this fluid through the perforations. Any sand remaining in the wellbore at the conclusion of this operation is then washed out. Once this has been done, the tubing and casing of the well can be filled with diesel oil and the injectivity of the formation can be checked. The alcohol, alone or in combination with a silane or other additives, is then pumped into the formation. After the alcohol has been placed, the well is shut in for a period which may range from about 30 minutes to about 120 hours or longer. It is generally preferred to leave the well shut in overnight.

Following the shut-in period, the resin solution or mixture of resin-forming materials to be employed for consolidation purposes is pumped into the well and injected into the surrounding formation. The procedure employed will depend primarily upon the particular resin selected. It is generally preferred to utilize a phenol-formaldehyde type resin solution containing about four parts of formalin by weight, about one part of metapara cresol or a mixture of meta-para cresol and 1,3,5 xylenol, about 13 percent guanidine carbonate, based on the weight of formalin and aryl compound, and about 2 percent sodium hydroxide, based on the weight of formalin and aryl compound, and to then follow this with an afterflush of diesel oil containing aout 2 percent meta-para cresol to prevent the extraction of cresol from the unset resin. If an epoxy resin is employed, it is normally preferred to inject an alcohol-kerosene solution containing about 50 percent or more of the resin and then follow this with from about 2 to about 10 volumes of a kerosene solution containing from about 0.5 to about 10 percent by weight of the catalyst or curing agent. After the resin solution or mixture of resin-forming materials has been injected, either in a single stage or in two or more stages, the well will normally be shut in to permit hardening of the resin. The hardening period required will depend in part upon the reservoir temperature and the effectiveness of the particular catalyst or curing agent employed. In general, hardening periods from about 8 hours to about 72 hours are preferred. Following hardening of the resin, the well can be returned to production.

The advantages of the process of the invention are further illustrated by the experimental results set forth in the following examples.

Example 1

In a first series of tests, sand tubes 3⅞ inches long and one inch in diameter taken from an oil producing interval found at a depth of 1510 to 1520 feet in a Texas Gulf Coast oil field were prepared. The clay mineral content of the material included 1.2 percent of calcium and magnesium montmorillonite, 3.3 percent illite, and 1.6 percent kaolinite. One percent of a sodium montmorillonite was added to this material before the sand tubes were prepared. In each case the sand was saturated to simulate an oil-bearing formation containing connate water. The tests, carried out in a water bath at a temperature of 100° F., involved the injection of a preflush into the sand and after 24 hours, the injection of a premixed phenol-formaldehyde resin solution to consolidate the sand grains. The resin solution contained 70.4 weight percent formalin, 13.5 weight percent meta-para cresol, 2.8 weight percent 1,3,5 xylenol, 11.8 weight percent of guanadine carbonate, and 1.5 weight percent sodium hydroxide. The afterflush solution consisted of diesel oil containing 1.8 weight percent meta-para cresol. Forty cc. of resin solution and 35 cc. of afterflush were used. The solutions were injected under a differential pressure of 50 p.s.i. The injection rate in cc. per second was measured during each test. Following injection of the resin, the cores were allowed to cure at 100° F. for 72 hours. At the end of the curing period, the permeabilities were measured and the compressive strengths of the consolidated materials were determined. The results of these tests are set forth in Table I below.

TABLE I.—EFFECT OF ALCOHOL PREFLUSH ON CONSOLIDATION WITH PHENOL-FORMALDEHYDE RESIN

| Test No. | Preflush | Resin injection rate, cc./sec. | Permeability retention, $K_{orig.}/K_{final}$, percent | Compressive strength, p.s.i. |
|---|---|---|---|---|
| 1 | 6% brine+1% silane.* | 0.0075 | 14.6 | 446 |
| 2 | n-Hexanol | 0.023 | 19.0 | 418 |
| 3 | n-Hexanol+2% silane* | 0.033 | 20.6 | 571 |

*2-aminoethyl-aminopropyl-trimethoxy silane.

It will be noted from the data in Table I that the use of normal hexanol in place of the usual brine preflush employed in test No. 1 permitted a three-fold improvement in the injection rate. The alcohol pre-treatment thus permits faster injection of the resin at a given pressure or at a given injection rate permits injection of the material at lower pressure. In many formations, the fracture gradients are such that the injection condition must be carefully controlled to avoid fracturing the formation. The use of normal hexanol or a similar alcohol to permit injection at lower pressures facilitates the consolidation of such formations. The data also show that the permeability retention values and compressive strength were better where the normal hexanol was employed in place of the brine generally employed with the phenol-formaldehyde type resins. The improved permeability permits greater production following consolidation and the improved compressive strength facilitates production at high rates with less danger of failure of the bonds between the resin and sand grains.

Example 2

Further tests similar to those described above were carried out to determine the effectiveness of other alcohols. The formation material employed was the same as that used earlier. The phenol-formaldehyde resin was the same as that employed earlier and was injected in the manner described in the previous example. The permeability retention values, expressed as a decimal fraction of the value obtained with the conventional salt water preflush, and the compressive strengths of the consolidated samples following the treatment are set forth in Table II below.

TABLE II.—EFFECT OF ALCOHOL CHAIN LENGTH ON CONSOLIDATION

| Test No. | Preflush | Permeability retention | Compressive strength, p.s.i. |
|---|---|---|---|
| 1 | 6% brine+1% silane | 1.0 | 447 |
| 2 | n-Pentanol | 0.5 | 559 |
| 3 | n-Pentanol+2% silane* | 0.6 | 1,008 |
| 4 | n-Hexanol | 1.4 | 571 |
| 5 | n-Hexanol+1% silane* | 0.8 | 597 |
| 6 | n-Hexanol+1.5% silane* | 1.0 | 1,049 |
| 7 | 2-ethyl-1-hexanol | 0.8 | 603 |
| 8 | 2-ethyl-1-hexanol+2% silane* | 0.7 | 324 |

*2-aminoethyl-aminopropyl-trimethoxy silane.

The data in Table II again show that the use of an alcohol preflush improves the compressive strength of the consolidated material and results in satisfactory permeability retention. It is also apparent from the data that normal hexanol gives somewhat better results than do the other alcohols and that the compressive strength increases with increasing concentrations of the silane.

Example 3

A field test of the invention was carried out in a Texas Gulf Coast well drilled to a total depth of 3750 feet. This well was a quadruple completion provided with separate tubing strings to each of the four producing zones. An unconsolidated zone was located in the interval between 2178 feet and 2191 feet. This interval produced 450 barrels per day of fluid containing 85 percent water and 15 percent oil on tests with no choke in the line. The formation pressure was 896 p.s.i. and the oil gravity was 16.5° API. Sand had been produced from the interval steadily over a seven-year period and frequent replacement of the Christmas tree had been necessary because of erosion. The treater had sanded up on occasion.

To consolidate the incompetent formation, 206 bags of 20–40 mesh sand was first injected through the perforations into the producing zone to fill the cavity created by production of the formation sand. Sand remaining in the wellbore was then washed out. Twenty-one barrels of diesel oil was pumped into the well to fill the tubing and casing and check the injectivity of the formation. At an injection rate of one barrel per minute, the surface pressure was 640 p.s.i. A preflush consisting of 440 gallons of normal hexanol containing 2 percent by weight of 2-aminoethylaminopropyl - trimethoxy silane was then pumped into the well. Diesel oil was used to displace the preflush solution through the tubing. About one barrel of the preflush was left in the casing. The well was then shut in and then allowed to stand for about 48 hours.

Following the shut-in period, twelve barrels of a phenol-formaldehyde base-catalyzed resin mixture was injected into the well at a pressure between about 600 and about 620 p.s.i. The resin mixture consisted of 70.4 weight percent of commercial 37 percent formalin, 13.5 weight percent meta-para cresol, 2.8 weight percent 1,3,5 xylenol, 11.8 weight percent guanadine carbonate and 1.5 weight percent sodium hydroxide. This was followed by five barrels of an afterflush consisting of 2 percent meta-para cresol in diesel oil. The well was then allowed to stand for about three days to permit hardening of the resin. At the end of this period, the well was returned to production. Tests showed little or no impairment in productivity and no sand production. Several months later the well was still producing at a high rate without any sand entrained in the fluids. The productivity of the well following consolidation was higher than it had been prior to the sand consolidation job. This well was located in a field where five earlier attempts at sand consolidation during the previous three-year period had all been unsuccessful and hence the results demonstrate the advantages of the method of the invention over conventional methods.

What is claimed is:

1. In a method for the consolidation of an incompetent subterranean formation surrounding a well wherein a resinous material is injected into said formation and allowed to harden, the improvement which comprises injecting into said formation from about 10 to about 100 gallons of a saturated aliphatic alcohol containing from 5 to 10 carbon atoms per molecule per foot of formation thickness, shutting in the well for a period of from about 30 minutes to about 120 hours, and thereafter injecting said resinous material into said formation.

2. A method as defined by claim 1 wherein said alcohol is normal hexanol.

3. A method as defined by claim 1 wherein said resinous material is a hydroxy aryl-aldehyde resin.

4. A method as defined by claim 1 wherein said resinous material is an epoxy resin.

5. A method as defined by claim 1 wherein said resinous material is a furfuryl alcohol resin.

6. A method as defined by claim 1 wherein said alcohol contains an amino-functional organosilane.

7. A method as defined by claim 1 wherein said resinous material is injected into said formation in two parts, a first par containing an aldehyde and a catalyst and a second part containing a low molecular weight hydroxy aryl compound.

8. A method as defined by claim 1 wherein said resinous mixture comprises formaldehyde, cresol, xylenol, guanadine carbonate and sodium hydroxide.

9. A method as defined by claim 1 wherein said resinous material is injected in two parts, a first part comprising an epoxy resin dissolved in a solvent and a second part comprising a hardener solution.

10. A method as defined by claim 1 wherein said alcohol is 2-ethyl-1-hexanol.

11. A method as defined by claim 1 wherein said alcohol is a mixture of isomers.

References Cited

UNITED STATES PATENTS

| | | | |
|---|---|---|---|
| 2,345,713 | 4/1944 | Moore et al. | 166—42 |
| 3,176,769 | 4/1965 | Treadway et al. | 166—33 |
| 3,199,590 | 8/1965 | Young | 166—33 |
| 3,221,814 | 12/1965 | Hower | 166—33 |
| 3,236,306 | 2/1966 | Atwood | 166—42 |
| 3,282,338 | 11/1966 | Walther et al. | 166—33 |
| 3,288,215 | 11/1966 | Townsend et al. | 166—42 |
| 3,297,089 | 1/1967 | Spain | 166—33 |
| 3,339,633 | 9/1967 | Richardson | 166—33 |
| 3,368,626 | 2/1968 | Bezemer et al. | 166—33 |

STEPHEN J. NOVOSAD, *Primary Examiner.*